US 6,612,545 B1

(12) United States Patent
Rutter et al.

(10) Patent No.: US 6,612,545 B1
(45) Date of Patent: Sep. 2, 2003

(54) SCREW ON CONNECTOR

(75) Inventors: Christopher C. Rutter, Oakland, CA (US); Lamar Spalding, Hayward, CA (US)

(73) Assignee: David S. Smith Packaging Limited (GB)

( * ) Notice: Subject to any disclaimer, the term of this patent is extended or adjusted under 35 U.S.C. 154(b) by 0 days.

(21) Appl. No.: 09/547,465

(22) Filed: Apr. 12, 2000

(51) Int. Cl.$^7$ ................................................. B65B 3/04
(52) U.S. Cl. ..................................... 251/149.6; 141/346
(58) Field of Search .......................... 251/149.1–149.9; 222/568, 570; 141/346; 285/390, 391; 137/614–614.06

(56) References Cited

U.S. PATENT DOCUMENTS

| | | | |
|---|---|---|---|
| 2,286,263 A | 6/1942 | Comins ...................... 285/177 |
| 3,405,831 A | 10/1968 | Hudson ........................ 215/43 |
| 3,632,142 A | * 1/1972 | Ichihara ...................... 285/362 |
| 4,421,146 A | 12/1983 | Bond et al. |
| 4,445,539 A | 5/1984 | Credle |
| 4,445,551 A | 5/1984 | Bond et al. |
| 4,564,132 A | 1/1986 | Lloyd-Davies |
| 5,042,844 A | * 8/1991 | Iida et al. .................... 285/251 |
| 5,095,962 A | 3/1992 | Lloyd-Davies et al. |
| 5,238,152 A | * 8/1993 | Maas et al. .................. 215/274 |
| 5,425,479 A | 6/1995 | Credle, Jr. |
| 5,454,605 A | * 10/1995 | Mott .......................... 285/333 |
| 5,467,806 A | 11/1995 | Stricklin et al. |
| 5,477,883 A | 12/1995 | Totten |
| 5,639,064 A | * 6/1997 | deCler et al. ............. 251/149.5 |
| 5,697,410 A | 12/1997 | Rutter et al. |
| 5,983,964 A | 11/1999 | Zielinksi et al. |
| 6,224,588 B1 | * 5/2001 | Jentzen ........................ 604/241 |

FOREIGN PATENT DOCUMENTS

GB          2339771 A          2/2000

OTHER PUBLICATIONS

International Search Report for PCT/US01/11531 mailed Nov. 19, 2001.

* cited by examiner

Primary Examiner—Gene Mancene
Assistant Examiner—Eric Keasel
(74) Attorney, Agent, or Firm—Joseph A. Fuchs; Michael S. Leonard

(57) ABSTRACT

An improved screw-on assembly for coupling line connectors with spouts has been invented. The invention can be used with bag-in-box packaging or with a variety of other applications requiring fluid coupling. In one embodiment, threading is accomplished by mating internal threads on a line connector with flexible tabs located on the spout. Deformation of the tabs during threading provides a restorative force that stabilizes the assembly during threading. Cooperation of the deformable tabs with structures near the end of the thread provides for self-locking of the assembly. In addition, the tabs are situated on a flange, providing compatibility of the present invention with prior art line connectors.

24 Claims, 5 Drawing Sheets

SCREW ON CONNECTOR

CROSS-REFERENCE TO RELATED APPLICATIONS

Not applicable.

FIELD OF THE INVENTION

The invention generally relates to a method and apparatus for quick connect and disconnect of a connector with a spout, and more specifically to an apparatus and method incorporating flexible tabs for threading, where the tabs provide for both axial stability during threading and self-locking action to keep the connector and spout coupled.

BACKGROUND OF THE INVENTION

Line coupling devices are commonly used in fluid-containing apparatus to allow for connecting or disconnecting lines with a minimum of fluid loss, usually at locations where fluids are introduced or extracted, or at locations that facilitate maintenance or other operations. As used here, the term fluid includes liquids, solid particles, and gases under pressure or vacuum, or combinations of these fluids. Providing for connecting or disconnecting of lines can be especially difficult with fluid-containing lines. Coupling of the lines while controlling fluid loss is usually achieved by incorporating coupling-actuated valves in one or more line ends or into a connector. Coupling actuates the valves, allowing fluid to flow through the connected lines, while uncoupling the lines seals one or both lines. Coupling-actuated valves of this design are applicable to a great variety of commercial, industrial, and consumer goods.

Of particular interest here are line connectors for use in the beverage industry where beverages and beverage syrups are packaged in a collapsible bag housed in a box, commonly referred to as a disposable bag-in-box package. An external line is attached to the bag-in-box package through a line connector that is configured for quick coupling to a bag through a spout. Leakage from the line and bag prior to coupling is minimized by line connector and spout valves that are configured to open when the line connector and spout are brought together, allowing fluid to pass through the connector. Engaging these connectors entails actions that both provide a leak-proof seal and open a valve to control fluid flow. In the case of beverage supplies in the service sector of the economy, where timely response to customer's desire is paramount, bag-in-boxes are often stored in areas that are not readily or easily accessible as under or above a service counter and in dimly lighted environments. Thus it is important that the connectors can also be easily worked by the operator with a minimum of motion and force, and with a minimum of movement of the connectors and other equipment. In addition, the spout portion of the connector is often incorporated into a disposable bag, and thus it is necessary that the spout and the valve mechanism internal to the spout be inexpensive.

The patents and publications discussed in this Background of the Invention provide background for the invention or are related to the invention. All publications and patents discussed herein are hereby incorporated by reference in their entireties for all purposes.

In the U.S. Pat. No. 4,445,551 to Bond et al., titled Quick-Disconnect Coupling and Valve Assembly, a connector is disclosed that slides into a slidable valve contained within a spout. The slidable valve has fingers that fit into the connector, so that sliding the connector into the spout causes the slidable valve to grip the connector and slide into a position in the spout where the slidable valve is opened. The alignment of the connector with the slider valve is crucial to the operation of this invention, and somewhat problematic with this configuration.

The U.S. Pat. No. 4,421,146, also to Bond et al., titled Quick-Disconnect Service-Line Connector and Valve Assembly, addresses some of the problems of the '551 patent. The '146 patent discloses a connector that has a lower U-shaped flange portion for coupling with the spout and an upper body portion for slidably housing the valve assembly, which is slidable toward the lower U-shaped flange portion and into the spout. The connector is coupled to the spout by positioning the connector adjacent the spout and then laterally shifting or positioning the connector so that the U-shaped flange is saddled about an outer surface of the spout. Disadvantages of this connector include requiring the operator to accurately position the various components during coupling and uncoupling, and requiring the use of both hands by the operator.

U.S. Pat. No. 4,564,132 to Lloyd-Davies, titled Fluid Dispensing Assembly, discloses a connector valve that has a nut rotatably connected to it, the mating and valve actuating occurring when the spout and nut threads are engaged. The incorporation of threaded spouts presents a problem in achieving compatibility between different bag-in-box connector systems. The use of a complete thread form also can require multiple turns for making a connection and involves using longer spout. These are disadvantages for systems located in small spaces since more room is required to operate the spout and it may also be difficult to load or remove the boxes.

U.S. Pat. No. 5,983,964 to Zielinksi et al., titled Method and Apparatus for Coupling with a Spout, discloses a valve subassembly for connecting to a line and a mating spout that contains a mechanism for actuating the valve subassembly. In that patent, the valve subassembly is described for use in conjunction with an axially engaged connector and was designed for compatibility with existing bag-in-box connectors.

The ITW New Zealand Corporation produces a screw on connector comprising a line connector and spout assembly (part number 390-0267) that incorporates partial threads on the spout for connecting with a threaded line connector. The ITW connector incorporates two rigid partial threads on the spout for mating with a threaded line connector, thus allowing for some amount of compatibility. The ITW connector further has a self-locking feature that incorporates a notch on the spout and a mating piece on the line connector that fits into the notch to form a detent. As with the Lloyd-Davies connector, placing a rigid thread on the spout provides compatibility with other connectors difficult.

Providing an inexpensive and easily manufactured line connector and spout combination that performs quickly, easily and positively with a minimum of motion is an important feature for bag-in-box connectors. In addition, it is important that the line connector and spout be easy and inexpensive to manufacture, and that the spout can inexpensively be incorporated into a disposable bag.

What is needed is a method and apparatus that will allow for quick coupling and decoupling of fluid-containing lines. It is preferred that this is accomplished with a minimum of rotational or lateral motion of the lines, that the coupling incorporate means for sealing off the lines when decoupled and opening the lines when coupled, and that the connector provides a positive indication to the operator that a coupling has occurred and locks the connectors to prevent decoupling. In addition, due to the large number of line connectors and spouts in the field, there also exists a need to have compatibility between new spouts and existing line connectors. To ensure compatibility between new and currently used connector designs, there is a need for bag-in-box spouts to conform to certain external dimensions and shapes. Current spout designs have a series of flanges extending radially outwards from the spout, making it difficult to incorporate threaded connectors with many current spout designs.

SUMMARY

The present invention is directed to a method and apparatus for coupling fluid-containing lines with a spout, and provides a novel method and apparatus for coupling with a spout that overcomes the problems in the prior art. The introduction of new coupling technologies is accelerated by apparatus compatible with the large base of existing equipment. Thus there is also a need for new spouts to be compatible with other, widely used line connectors. The apparatus of the present invention is comprised of a line connector paired with a spout, where the combination has cooperating threaded features to provide a positive, self-locking action when the pair are coupled. The line connector is fitted with a nut having an internal flange that fits into a recess in the connector, allowing for the line connector to threadably engage the spout by rotating only the nut. The spout is fitted with one or more, but preferably two, tabs that can be threadably engaged by the nut. The tabs extend radially outwards from a tab flange, that itself extends radial outwards from the spout. The tab flange and other flanges on the spout are provided so that the spout of the present invention is compatible with existing line connectors. Specifically, in addition to the line connector and spout of this invention working together, the spout of the present invention will work with some of the more common prior art line connectors.

Stability during threading is achieved in several embodiments by the force that flexed tabs impart onto the threads. If the connector is not axially aligned, then the several tabs will not respond equally to the misalignment, and the resulting forces will tend to straighten the connector and stabilize the threading action. When threaded, the connector provides resistance to valves that may be internal to the connector. Specifically, concentric with and internal to the line connector and spout are one or more spring-loaded poppet valves that open when the line connector is coupled to the spout. Actuating the valve produces an axial force on the tab that acts to uncouple the connector. There is a tab restraining portion of the threads that provides the operator with positive identification that the connector is fully coupled and that the connector will not unthread to the extent that valves that are internal to the connector close. In one embodiment, the tab restraining portion includes a detent formed by thread and tab that is held in place by the action of the axial force. In a second embodiment the threads taper near the tab restraining portion and the tabs are deformably forced into place. In a third embodiment the axial force deforms the tabs within the threads increasing the contact area between tab and thread, and thus the frictional force for threading.

In view of the discussion above, there exists a demonstrated need for an advancement in the spout coupling art. It is therefore an advantage of the present invention to provide a novel method and apparatus for coupling with a spout that overcomes the problems in the prior art.

It is also an advantage of the invention to provide a novel method and apparatus that can quickly couple and decouple fluid-containing lines in a single-handed operation.

It is an advantage of the invention to provide a novel method and apparatus that can quickly couple and decouple fluid-containing lines that is compatible with existing, non-threaded connectors.

It is also an advantage of the invention to provide a novel method and apparatus for coupling of cylindrical shaped bodies with a quick screw-on connector that is self-locking and provides a positive indication of coupling.

It is yet another advantage of the invention to provide a novel method and apparatus for a combination of line connector and spout, where the spout is compatible with existing line connectors.

It is an advantage of the invention to provide a spout and line connector combination with a positive, self-locking stop by the cooperation of deformable tabs on the spout with line connector thread.

It is yet another advantage of the invention to provide a spout and line connector combination with deformable tabs on the spout and threads on the line connector where the tab deformation stabilizes the spout and line connector during threading.

It is yet another advantage of the invention to provide a spout and line connector combination with deformable tabs on the spout and threads on the line connector where the tab deformation locks the spout and line connector when fully threaded.

It is also an advantage of one embodiment of the invention to incorporate a detent into the connector though the cooperation of deformable tabs with line connector threads that restrict the decoupling unthreading of the connector.

It is an advantage of a second embodiment of the invention to deform the tabs within the threads, thus resisting decoupling by increasing the torque required to decouple the connector.

It an advantage of a third embodiment of the invention flex the tabs within the threads, thus resisting decoupling by increasing the friction between tab and thread.

It is another advantage of the invention to provide an novel method and apparatus for coupling with a spout that is economical.

A further understanding of the invention can be had from the detailed discussion of specific embodiments below. For purposes of clarity, this discussion refers to devices, methods, and concepts in terms of specific examples. However, the present invention may operate with a wide variety of types of devices that are axially connected. Other industries and applications likewise require a convenient means for connecting and disconnecting a connector with a spout, which may have a valve therein. In view of the disclosure of this application it will be obvious to one skilled in the art that many different embodiments can be devised to achieve the advantages of this invention. Furthermore the invention is described in terms of systems that include many different innovative components and innovative combinations of components. No inference should be taken to limit the invention to combinations containing all of the innovative components listed in any illustrative embodiment in this specification.

DESCRIPTION OF SPECIFIC EMBODIMENTS

In order to facilitate the description of the present invention, the following discussion will describe the invention in terms of line connectors used in the beverage industry. It will be understood to those of skill in the art, however, that the invention also may be used as a connector between other components that are axially connected and in equipment used to transport a wide variety of liquids or gases. In addition, the advantages of the connector can be achieved with embodiments that are not specifically disclosed but would be obvious to one skilled in the art in light of this disclosure.

Overview of the Invention

Figure 1:
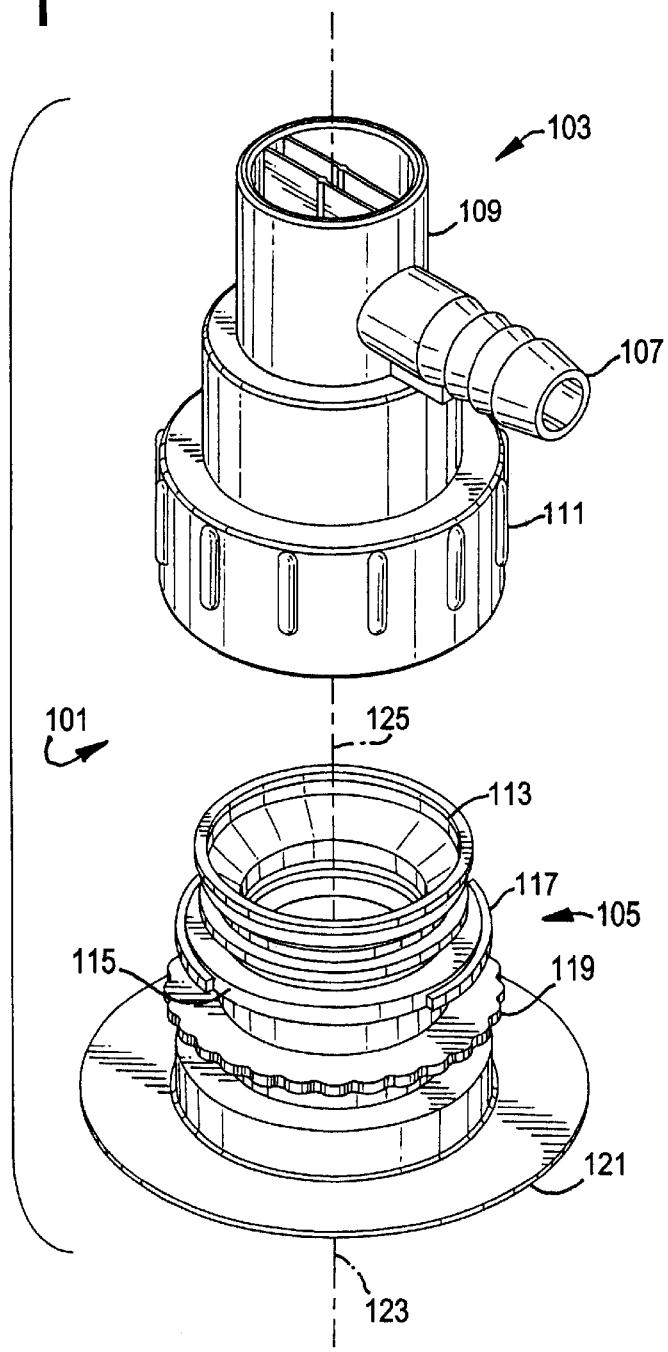
FIG. 1 is a perspective view of an embodiment of the invention.
Figure 2:
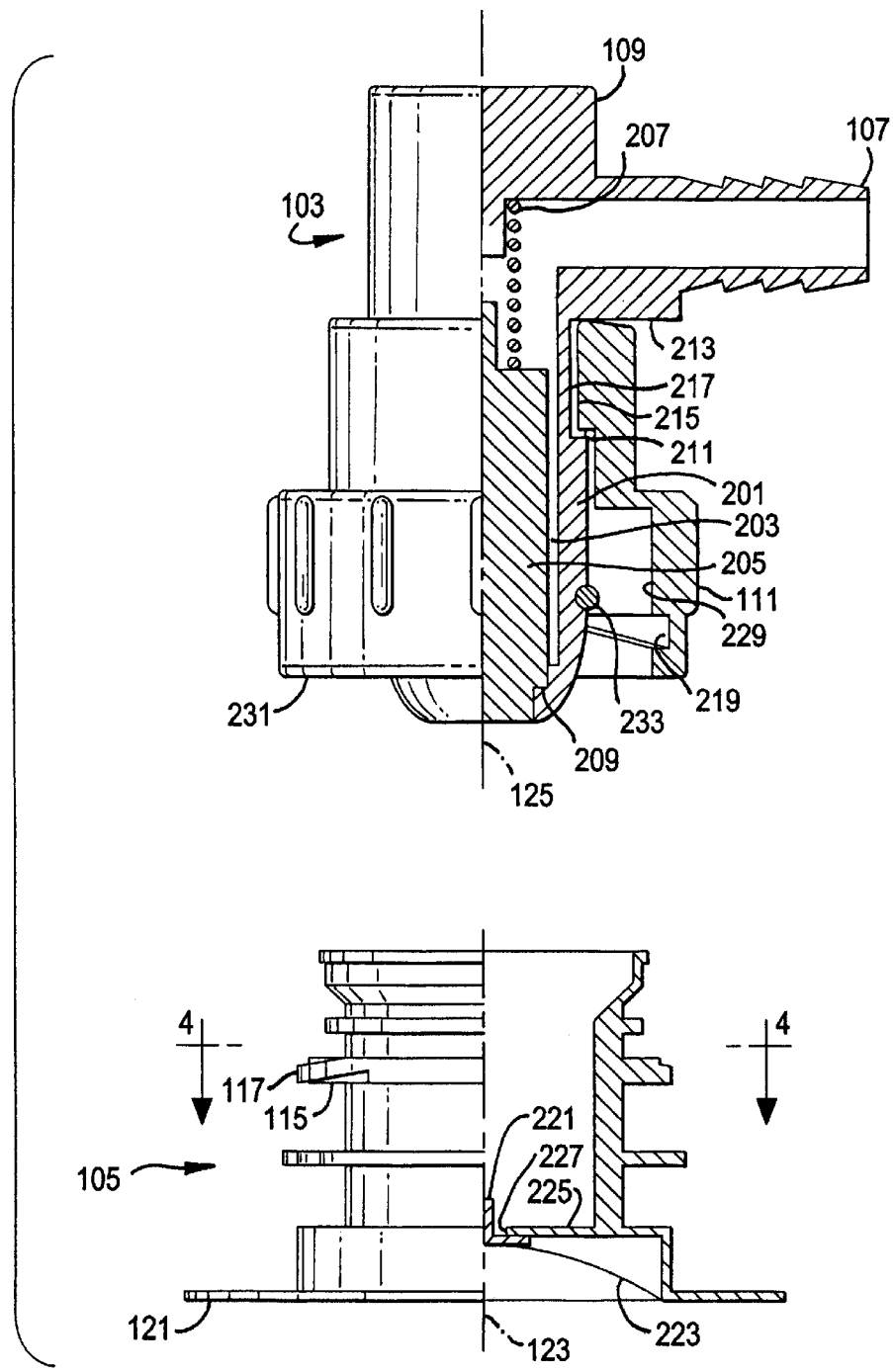
FIG. 2 is a combined side view (left side) and cross-sectional side view (right side) of an uncoupled connector embodiment of the invention.
Figure 3:
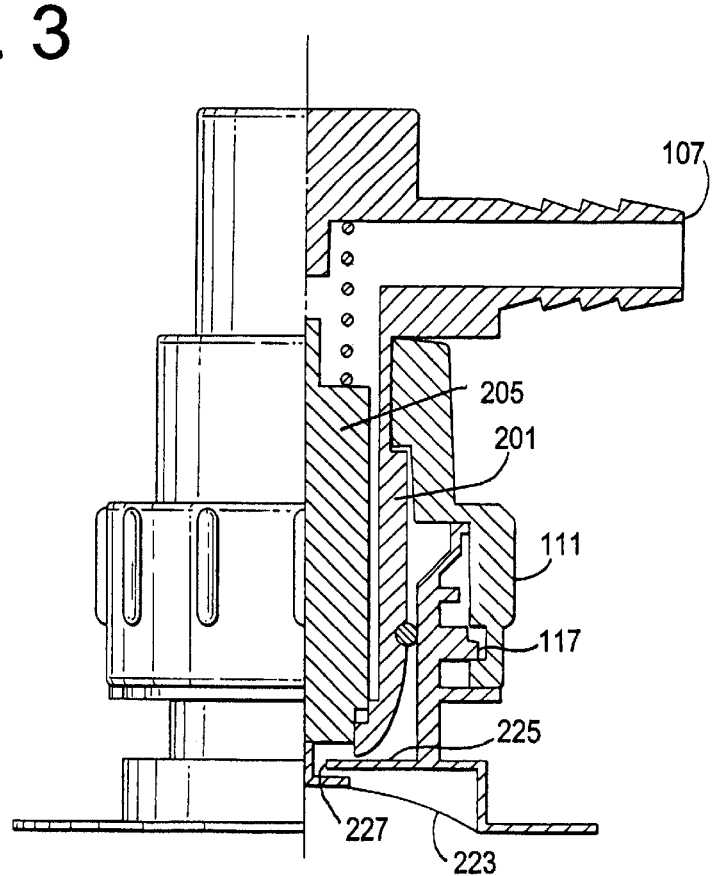
FIG. 3 is a combined side view (left side) and cross-sectional side view (right side) of a coupled line connector and spout of the invention.

An embodiment of a connector assembly 101 of the present invention is shown uncoupled in the perspective view of FIG. 1 and in the side view of FIG. 2, and coupled in the side view of FIG. 3. Connector assembly 101 is comprised of a line connector 103 and a spout 105. As configured for a bag-in-box system, line connector 103 is attached to a hose or tube (not shown) at a fluid line adapter 107, and spout 105 is attached to a bag (not shown) at a bag flange 121. The fluid line adapter can be either a barbed adapter as shown in the embodiment of FIGS. 1 to 3, or may be another adapter known in the art for connecting lines such as Swagelock™, Hansen™, or any other appropriate adapter type. The bag is sealed to bag flange 121, usually using the technique of heat sealing. As described subsequently, line connector 103 and spout 105 are adapted to allow coupling of the line and bag to allow fluid to flow between them by threading a tab 117 located on the spout to a thread 219 internal to the line connector. It is understood that in conjunction with this invention, the term "fully coupled" implies that the coupled connection 1) does not leak fluid, and 2) allows for an appreciable flow of fluid through it. Thus a connector is considered fully coupled if it does not leak and the valve does not close.

Line Connector

In addition to fluid line adapter 107, line connector 103 comprises has an internal valve subassembly 109 and a collar nut 111. Valve subassembly 109 has a valve body 201 with an internal cavity 203 that is open to the interior of fluid line connector 107, and has a valve stem 205 inside the cavity. Also inside the cavity is a valve or biasing spring 207 which is preloaded to exert an axial force on stem 205, forcing it against sealing area 209. Valve stem 205 can thus translate axially within cavity 203 from a normally closed position, as shown in FIG. 2, to an open position, against the force of spring 207, as shown in FIG. 3.

Collar nut 111 is rotatably disposed about valve body 201, and includes nut flange 215 which axially locates the collar to the valve body by engagement with recess 217. Recess 217 is formed by a nut locating shoulder 211 and a nut restraining surface 213 that may be attached to fluid line adapter 107. An inner surface 229 of collar nut 111 is preferably provided, starting at a tab receiving end 231, with threads 219 that are adapted to facilitate connecting the valve body to the spout 105. Nut 111 and valve body 201 are oriented to allow coupling of assembly 101, preferably by each having a coincident valve body and nut axis 125.

Figure 6:
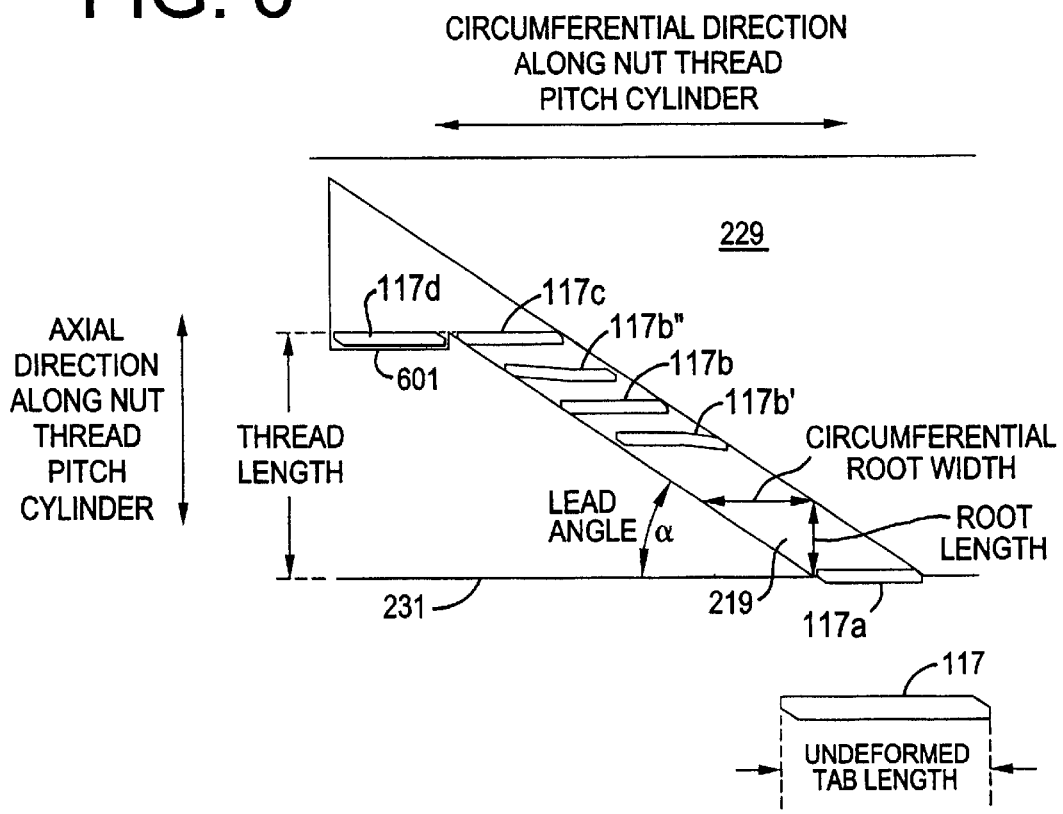
FIG. 6 is a first embodiment thread form view of the connector threads of the invention, along with the position and shape of the tabs at various stages of threading. The axial and circumferential dimensions are shown out of proportion to more clearly show the lead angle and the deformation of the tabs.
Figure 7:
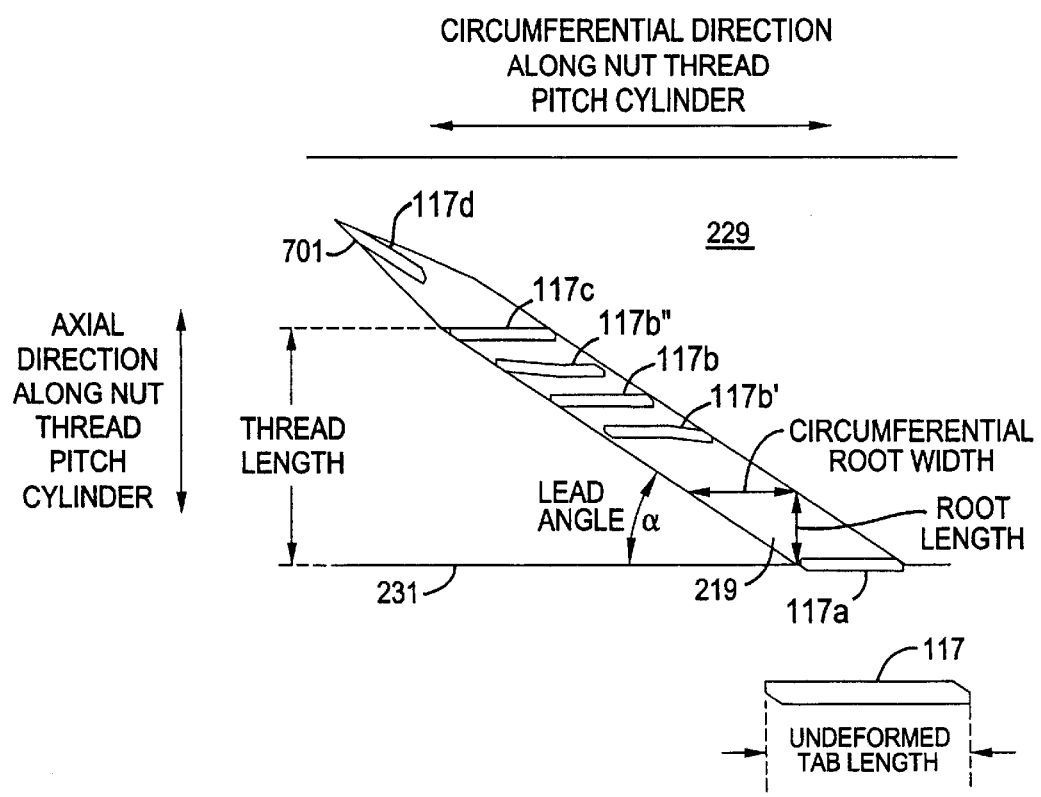
FIG. 7 is a second embodiment thread form view of the connector threads of the invention, along with the position and shape of the tabs at various stages of threading. The axial and circumferential dimensions are shown out of proportion to more clearly show the lead angle and the deformation of the tabs.

An internal view of nut 111 is shown for two embodiments of this invention in FIGS. 6 and 7. Those figures show, respectively, a first and second embodiment of a thread plan as an unfolded plan view of nut inner surface 229 showing one of threads 219. The advantages of this invention can be achieved with one or more threads, with two preferable for quick-connect operation. The first and second embodiments incorporate square threads of constant lead angle, $\alpha$. Although square threads are shown, it will be appreciated by those skilled in the art that thread geometries configured to be compatible with other components of this invention can cooperatively work to achieve the advantages of this invention, including but not limited to other thread forms and threads of other pitches or of variable pitch.

FIGS. 6 and 7 show the cylindrical inner surface 229 is presented in a planar view, with one axis in the axial direction along nut axis 111 and the other in a circumferential direction along the nut thread pitch cylinder. The line that bounds thread 219 is the root, or recessed area, of the thread. Since the threads of this particular embodiment are square, the line representing thread 219 as seen in FIGS. 6 and 7 is also an edge view of the thread surfaces that contact the tabs or other threadably engaged members. Also shown are the tab 117 at various stages of threading. The tabs or other members to be threadably engaged with nut 111 contact the nut along the nut as shown as the outline of the root of the threads 219. Some of the thread dimensions are shown in FIGS. 6 and 7 include lead angle, $\alpha$, the root opening in the circumferential direction ("circumferential root width"), and the root opening along the pitch axis ("root length").

For quick-connect operation thread 219 comprises a pair of square threads with an exemplary constant lead angle $\alpha$ in the range of about 2 to about 15 degrees, with the threads starting at tab receiving surface 231. To provide coupling with a minimum of motion, the layout of thread 219 should be such that nut 111 is fully engaged in three-quarters of a turn or less. Note that in order to better shown the operation of the invention, the axial and circumferential dimensions in FIGS. 6 and 7 are not to scale, with the axial dimension exaggerated relative to the circumferential dimension, and thus the angles in FIGS. 6 and 7 is shown as larger than the exemplary angles.

One difference between the various embodiments is the interaction of the thread and tabs when the connector is nearly fully coupled. The first and second embodiments of FIGS. 6 and 7 differ with respect to the interaction of the threads and tabs when the tabs are fully engaged at the tab restraining portions of the thread. In the first embodiment of FIG. 6 thread 219 opposite tab receiving surface 231 has as a tab restraining portion that is a detent end 601. The second embodiment of FIG. 7 has a the tab restraining portion of the thread that includes a tapered thread 701 formed by a decrease in the thread root dimensions. In a third embodiment (not shown) the threads are of uniform pitch and form, with the tab restraining portion including an end to the thread, thus forming a positive stopping location for the tabs when the connector is fully coupled. Details of the operation of tabs in this invention is discussed subsequently.

Spout

Spout 105 has a spout opening 113 at the spout end opposite bag flange 121 to provide a exit for fluid contained in the bag. The external surface of the spout also has a tab flange 115 extending radially outwards from spout 105. On the most radially outwards surface of tab flange 115 are at least one, and preferably two or more, tabs 117 that likewise extend radially outwards from both spout 105 and the tab flange. The present invention incorporates the advantages of a screw-on self-locking assembly in a connector that is compatible with existing bag-in-box connectors. Prior art spout threads include either 1) a full male one start threads requiring one or more turns, and thus requiring considerable vertical space, or 2) incorporate pitched partial threads, forcing an increased vertical height. The present invention reduces vertical height requirement, maintaining compatibility with existing connectors, and also minimizes the spout height, leading to easier box loading and removal of the spout by the end user.

Figure 4:
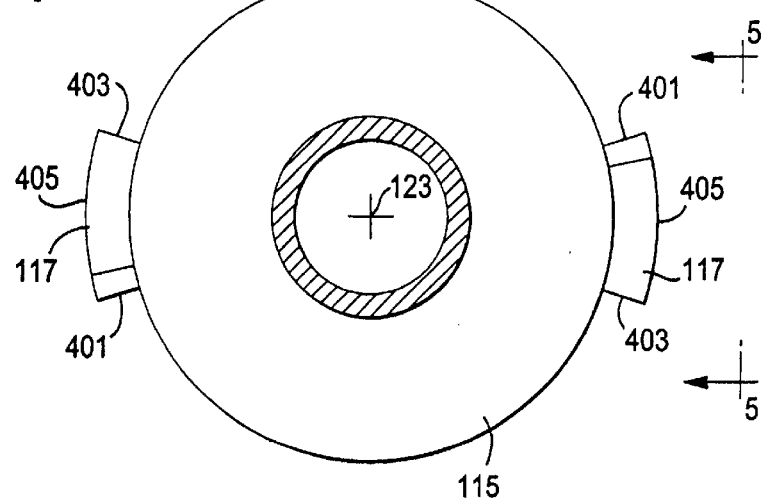
FIG. 4 is a sectional top view 4—4 from FIG. 3 highlighting the configuration of the tabs relative to the spout and tab flange.
Figure 5:
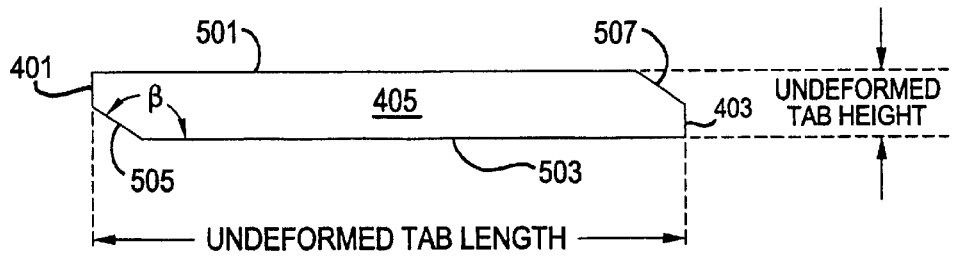
FIG. 5 is a side view 5—5 from FIG. 4 of a tab in an embodiment of the present invention.

The general shape and dimensions of tabs 117 are most easily considered in relation to a spout axis 123. As seen in the top view of FIG. 4, the tabs have a leading edge 401 that enter threads 219 first upon threading, and a trailing edge 403 that enters threads 219 last upon threading. Both leading edge 401 and trailing edge 403 are approximately perpendicular to flange 115, as shown in FIG. 5. Other tab 117 surfaces are a tab top side 501 and tab bottom side 503, both of which are approximately in the same plane as flange 115, a leading edge bevel 505 and a tab trailing edge bevel 507, and an outer tab surface 405 that is furthermost from the spout axis 123. Leading edge 401 and bottom side 503 have an included angle, $\beta$, as does trailing edge 403 and top side 501. Included angle $\beta$ can be from 5 to 15 degrees. The dimensions of the tabs depend on the amount of interaction with the threads required to achieve the advantages of this invention, and thus will depend on the application, the required torque and force, the strength and resilience of the materials used. For the embodiments presented here each undeformed tab length extends approximately 5% to 20% of the outer surface of the tab flange 117, has a thickness of from about 1 mm to about 3 mm, and has a depth sufficient to engage threads 219. In addition, the undeformed tab length may range from 80% to 120% of the circumferential root width depending on the required amount of interaction between tabs and threads.

One key feature of the present invention is the flexing and/or deformation of tabs during threading and in cooperation with the tab restraining portion of the threads. The tabs are adapted to flexibly cooperate with the threaded line connector during threading. Specifically, tab outer surface 405, which is the radially outermost edge, moves in a direction along spout axis 123, and tab leading edge 401 and tab trailing edge 403 move to change the shape of the undeformed tab length, as seen in 117b, 117b', and 117b" of FIGS. 6 and 7. The undeformed tab length may be less than, equal to or greater than the circumferential root width, with the relative dimensions between thread and tab controlling the amount of deformation of the tab during threading. In addition, in some embodiments, tab leading edge is adapted to deformably mate into the threads at the tab restraining portion of the thread, as at tapered thread 701. For a bag-in-box liquid dispensing system, the tabs flex under the axial force applied by an operator which the connector is being coupled, and the tab restraining interaction acts against the force of internal valves and the action of the operator when uncoupling the connector. The operation of this invention during threading and when coupled, and the action of valves internal to the connector are discussed subsequently.

Other flanges may be incorporated onto the flange, including a locating flange 119 positioned to extend radially outwards from spout 105 and axially positioned between tab flange 117 and bag flange 121. In addition, there are many valve configuration that can act to seal the line connector and spout. One such configuration is shown in FIGS. 2 and 3. Internal to and near the bag flange end of spout 105 is a poppet valve 221 for sealing the spout. Poppet valve 221 is adapted to seat against spout sealing surface 225 under the action of poppet valve spring 223. A poppet valve port 227 in spout sealing surface 225 provides opens when poppet valve 221 is opened against the force of spring 223.

Preferred materials are those that provide the strength needed to contain the pressure of the fluid lines, have compatibility with the fluid materials, and be easy and inexpensive to manufacture. For use in bag-in-box packages, polyethylene is typical of preferred materials.

Operation of the Invention

The operation of the present invention will be illustrated by way of a connector for a bag-in-box liquid dispensing system. It will be understood by one skilled in the art that this invention is not limited to use in bag-in-box packages, and that the advantages of thump invention can be achieved by implementation in other fluid handling systems. Connector assembly 101 is shown in an uncoupled configuration in FIGS. 1 and 2. The fully coupled assembly 101 is shown in FIG. 3. For illustrative purposes that are not meant to limit the scope of this invention, line connector 103 is assumed to be connected to a fluid-containing line at fluid line adapter 107 and spout 105 is assumed to be connected to a fluid-containing bag at bag flange 121. When uncoupled, line connector 103 and spout 105 are sealed with internal valves. Specifically, valve stem 205 is in a closed position, keeping any fluid contained in cavity 203 or fluid line adapter 107 from escaping from valve subassembly 109, and poppet valve 221 is in a closed position, keeping any fluid contained on the side of the poppet valve opposite spout opening 113 from escaping. In conjunction with this invention it is understood that a connector is considered "fully coupled" as long as an the connection 1) does not leak fluid, and 2) allows for an appreciable flow of fluid through it. Thus a connector is considered fully coupled if it does not leak and the valve does not close.

Connector assembly 101 allows line connector 103 and spout 105 to be coupled, allowing fluid to be transferred from fluid line connector 107 to the end of spout 105 near bag flange 121. Coupling is achieved by aligning valve body axis 125 with spout axis 123, allowing the valve body to be inserted into the spout. In addition to axis alignment, a tab receiving end 231 of collar nut 111 is rotated so that threads 219 are brought in contact with tabs 117. Nut 111 is pushed towards bag flange 125 while threading tab 117. The force necessary for threading includes a force to move valve stem 205 against spring 207 and a force that results in deformation of flexible tab 117. Fluid sealing during coupling is achieved with an o-ring 223 on the outer surface of valve body 205 that contacts the inner surface of spout 105, providing a seal to prevent fluid from leaving connector assembly 101. When valve stem 205 and poppet valve 221 further axially approach each other during coupling, the valve stem and poppet valve come into contact, forcing them against their respective spring elements, and providing an axial force that pushes the line connector and spout away from one another in an axial direction. Prior to full coupling, valve stem 205 and poppet valve 221 both unseat, providing an opening through the connector.

One important feature of this invention is that tab deformation is used to provide stability during threading of the connector. In conventional prior art threading apparatus, the function of the flexible tabs of the present invention are replaced with rigid tabs or threads. During threading, forces that cause the spout and nut axis to become misaligned are resisted by prior art rigid connector components. In the present invention, the undeformed tab height is small, on the order of the height of the tab flange, which is from about 1 mm to 3 mm, and preferably about 1.5 mm. The thin structure of the present invention is limited in the amount of support that the connector components can receive during threading. Deformation of the tabs will result from pushing or pulling on the tabs or by misalignment of the axis. Axial pushing or pulling will result in an reactive axial force. Deformation of the tabs due to misaligning the spout and nut axis during threading results in restorative, stabilizing forces that will tend to realign the axis. In some embodiments it will be advantageous to use tabs that are too large for the thread, and thus the tab will deform during the majority of threading. If less support is required, other embodiments may have tabs that easily fit into the thread, and would have little or no deformation in the absence of an axial force. In either case, misalignment of the spout and nut axis will tend to deform the tabs, producing a force tending to realign the axis. The undeformed tab length may range from 80% to 120% of the circumferential root width depending on the required amount of interaction between tabs and threads. With an undeformed tab length of 80% of the circumferential root length, the tab will travel up the threads and interact primarily when the spout and connector are misaligned or when there is an axial force. With an undeformed tab length of 120%, the tab will deform during most of the threading, providing support and stability to the assembly.

Other important features of this invention include the quick connect/disconnect action accomplished by having a lead angle α and thread length chosen so that nut 111 fully engages tabs 117 in three-quarters of a turn or less of the nut, and the placing of tabs 117 along the outer edges of tab flange 115. The quick connect/disconnect action allows assembly 101 to be coupled with a minimal amount of motion, while placing flexible tabs 117 on a flange 115 allows the spout to be used with other, possibly prior art, line connectors that require only a flange for coupling.

Yet another important feature of this invention is the self-locking feature that results from the interaction and cooperation of tabs and threads in the fully coupled connector. In some embodiments the axial force interacts with thread and tab to form a detent or to deform the tabs to provide a self-locking action. In other embodiments the tabs deform into the threads, providing a resistance to uncoupling. The amount of force required to achieve the advantages of this invention will necessarily depend on the materials, application, and force available to the operator. For application in a bag-in-box liquid delivery system, it is preferred that the torque applied to nut 111 or any other portion of connector assembly 101 for operation of the present invention be less than approximately 10 lbf-in. At the start of threading, the interaction between threads and tab should be minimal, preferably less than 0.5 lbf-in, and possibly even 0 lbf-in. As threading proceeds the tabs deform and the torque increases to about 10 lbf-in, preferably not greater than about 7 lbf-in. The torque to unlock the connector from the spout is in the range of from 5 lbf-in to about 10 lbf-in, and is preferably not less than about 7 lbf-in.

The operation of the invention will now be discussed in detail for three embodiments. It is understood that the examples and embodiments described herein are for illustrative purposes only and that various modifications or changes in light thereof will be suggested to persons skilled in the art and are to be included within the spirit and purview of this application and scope of the appended claims.

The progress of tab 117 during threading is shown in FIG. 6 for a first embodiment and FIG. 7 for a second embodiment. In both cases the undeformed tab height is much smaller than the undeformed tab width, as seen in FIG. 5, and the tab width is nearly equal to the circumferential root width, as shown in FIG. 6. For example, the tab width can be from about 5 mm to about 25 mm, while the tab height is from about 1 mm to about 3 mm. This arrangement is for illustrative purposes and is not meant to limit the scope of this invention. By choosing the width of tab 117, the amount of contact with thread 219 can be controlled. The width of tab 117 as shown in these particular embodiments is assumed to be small enough so that the tab can progress along thread 219 without contact, and will deform due to forces that cause misalignment. In absence of axial forces, tab 117 would thus fit within thread 219 without deformation. Tab 117a represents the first contact of the tab with nut 111. The included angle β (see FIG. 5) is chosen relative to lead angle α, such that the tab can easily catch the beginning of thread 219 and will not bind during threading. As nut 111 is rotated, tab 117 travel up the open area of thread 219, from tab 117b midway up to tab 117c at the end of the thread. When nut 111 is fully engaged, tab 117d is locked into the thread at a tab restraining portion which is a detent 601 in the first embodiment and a tapered thread 701 in the second embodiment, and the operator will feel a positive indication that the tabs are fully threaded. For a more positive indication, the detent can be shaped to provide a slight click when engaged. Any fluid that is in the line attached to fluid line adapter 107 in the bag attached to bag flange 121 can now pass through the connector.

The deformation of tab 117b is shown in both FIGS. 5 and 6. As noted previously, deformation may occur because of a displacement with or without spout axis 123 and nut axis 125 aligned. As shown in FIGS. 1–3, the embodiments have two tabs, although more may be used. With two tabs, the force resulting from deformation is imparted in two places on thread 219 which are 180 degrees apart. When nut 111 is being forced onto spout 105, or if the axis are being displaced towards tab 117b, deformed tab 117b' results. The trailing edge of tab 117b' preferentially contacts the trailing edge of thread 219, resulting in a force away from the opening of nut 111. When nut 111 is being pulled away from spout 105, or if the axis are being displaced away from tab 117b, deformed tab 117b" results. The heading edge of the tab 117b" contacts the leading edge of thread 219, pushing the nut 111 onto spout 105. Both of these forces, alone or in concert with the forces of other tabs, stabilizes connector 101 during threading.

The amount of deformation and the resulting forces that the tab undergoes while threading depends on the undeformed tab height and length, the circumferential root width, the root length, and the bevel and lead angles. These factors, along with the choice of materials, governs the forces that the tab imparts to the thread as a result of deformation during threading, and the effect of axial forces on tab deformation. Alternative embodiments include a longer tab that must undergo deformation for threading, thereby increasing the interaction between thread and tab, and hence the restoring force, and increasing or decreasing the rigidity of the tab material to increase or decrease the restoring force.

In the coupled configuration, tab 117d is forced into a position that results in a self-locking action. When coupled, the contact between valve stem 205 and poppet valve 221 cause both of the valves to open, while the force of springs 207 and 223 produce an axial force that mutually repels line connector 103 and spout 105. Thus tab 117d, which is the tab in the coupled configuration, undergoes a force pushing the tab towards the tab receiving end 231. To remained fully coupled, the self-locking action resists spring 207 and 223 forces, as well as any externally applied force. In the first embodiment of FIG. 6, the leading edge of thread 219 has a notch that acts as detent 601. The fully threaded tab 117d drops into detent 601 and is held in place by the axial force of the coupled valves, and deformation of tab 117d is not necessary in this embodiment to restrain the tab in the fully threaded position. In an alternative embodiment, tab 117 may be configured to be self-locking within the detent without the force of the springs. In either case unthreading is accomplished either by pushing nut 111 towards spout 105 followed by an unthreading twist, or by twisting hard enough to cause tab 117d to deform and jump over detent 601.

In the second embodiment of FIG. 7, there is a change in the shape of thread 219 as it tapers to tapered thread 701. Tapering is accomplished by narrowing the dimensions of the which the tab moves during engagement. For the square threads of FIG. 7, the circumferential root width, the root length, or some combination of these dimensions decrease over the last fractional turn before nut 111 is tightened. As a result of threading tabs 117 into this tapered or confined space, a positive, self-locking stop is provided by tightening nut 111 with enough force to deform and lodge tab 117d into tapered thread 701. Spring forces 207 and 223 act to increase the friction required to uncouple the connector, but are not necessarily required for this embodiment. Tab 117 and thread 219 materials are chosen so that the lodged tab 117d requires a force greater than the axial valve force for unlodging.

In a third embodiment (not shown) the threads are of uniform pitch and form, with the tab restraining portion including an end to the thread, thus forming a positive stopping location for the tabs when the connector is fully coupled. The end of thread for this embodiment includes, for example, a thread that presents a flat surface to the leading tab surface, or any other shaped surface on the threaded body presenting a surface that would be perceived by the operator as indicating that the end of thread had been reached. As line connector 103 and spout 105 are brought together during coupling, the force of springs 223 and 207 increases. The increased force flexes tabs 117 in a manner similar to tab 117b' or 117b" of FIG. 6 or 7, increasing the friction on the threads and the force necessary to couple or uncouple the connector. When fully coupled, the increased friction is sufficient to resist any uncoupling force, either from springs 223 and 207, or from an external source. In an alternative embodiment, tabs 117 may long enough so that they are deformed by the threads, irregardless of any forces on the tabs. Thus the tabs will naturally deform and increase the friction with the threads, providing an uncoupling resistive force.

When decoupling the line from the bag, nut 111 is twisted in the direction necessary to unthread the nut with a force sufficient to deform tab 117d so that the thread can proceed towards tab receiving end 231 of the nut. In addition, a slight axial force on nut 111 towards spout 105 will also facilitate unlocking the nut. The spout and line connector will be forced away from each other due to the unthreading motion, the both valves will reseat, the o-ring seal will be broken and the line connector and spout can be decoupled. Only fluid that is between spout sealing surface 225 and o-ring 233 that can escape from connector assembly 101 when the connector is decoupled.

As mentioned previously, for application in a bag-in-box liquid delivery system, it is preferred that the torque applied to nut 111 or any other portion of connector assembly 101 for operation of the present invention be less than approximately 10 lbf-in. At the start of threading, the interaction between threads and tab should be minimal, preferably less than 0.5 lbf-in, and possibly even 0 lbf-in. As threading proceeds the tabs deform and the torque increases to about 10 lbf-in, preferably not greater than about 7 lbf-in. The torque to unlock the connector from the spout is in the range of from 5 lbf-in to about 10 lbf-in, and is preferably not less than about 7 lbf-in.

Alternate Embodiments

In addition, there are other embodiments within the scope if this invention. The invention may be embodied by with axially engaging valves of many different designs. Thus the spout valve could be a slider valve with a probe to actuate the valve stem or could be a poppet valve with a unitary springs valve design, or could not include a valve and consist substantially as a probe to actuate the stem valve.

There are also other thread designs and configurations that would allow the device to perform according to the invention. Some examples are the incorporation of threads that are other than square, that do not have a constant pitch, or that do not have a constant threading area. In addition, the self-locking and stabilizing action of the threads of the present invention can be accomplished by several means, including having threads that have varying undeformed tab height, or that have rounded leading or trailing edges. The secureness of the coupled connector can be adjusted through the spring forces of both the valve springs and the stiffness of the tabs, for example as in raising the torque for coupling and uncoupling by increasing the spring forces.

Conclusion

The invention has now been explained with regard to specific embodiments. Variations on these embodiments and other embodiments may be apparent to those of skill in the art. It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed:

1. A spout and connector assembly comprising:
   a) a spout having an outer surface and a spout opening;
   b) at least one flexible tab attached to and protruding away from the outer surface; and
   c) a connector having a connector opening and an internal thread;
      wherein when the at least one flexible tab and the internal thread are rotatably engaged together during assembly of the spout and connector, the at least one flexible tab is deformed and provides an alignment force that tends to align the connector and spout; and
      wherein the at least one flexible tab is deformed such that a torque to the connector is less than about 10 lbf-in.

2. The assembly of claim 1, wherein the at least one flexible tab and the internal thread are so configured and arranged that the spout and connector are fully coupled together with no more than about three-quarters of a turn.

3. The assembly of claim 1, wherein the torque is from about 5 lbf-in to about 7 lbf-in.

4. The assembly of claim 1, wherein the at least one flexible tab includes two flexible tabs.

5. The assembly of claim 1, wherein the at least one flexible tab has an undeformed tab length of from about 80 percent to about 120 percent of a circumferential root width of the internal thread.

6. The assembly of claim 5, wherein the internal thread has a lead angle of from about 2 degrees to about 15 degrees.

7. The assembly of claim 5, wherein the at least one flexible tab has a leading edge and a bottom which form an included angle of from about 5 degrees to about 15 degrees.

8. The assembly of claim 1, wherein the internal thread has an abrupt end, and the at least one flexible tab and the abrupt end provide a positive indication that the spout and connector are fully coupled.

9. The assembly of claim 1, wherein the internal thread has a tapered thread portion, and the at least one flexible tab and the tapered thread portion provide a positive indication that the spout and connector are fully coupled.

10. The assembly of claim 9, wherein an undeformed height of the at least one flexible tab is from about 1 mm to about 3 mm.

11. The assembly of claim 1, wherein the internal thread has a detent, the at least one flexible tab and the detent provide a positive indication that the spout and connector are fully coupled.

12. The assembly of claim 1, further comprising a valve biased towards a closed state, the valve having an open state when the spout and connector are coupled together.

13. The assembly of claim 1, wherein the spout and connector are coupled together such that the spout and connector can be uncoupled with a torque of less than about 10 lbf-in.

14. The assembly of claim 13, wherein the torque is from about 7 lbf-in to about 10 lbf-in.

15. The assembly of claim 1, wherein a spout axis of the spout and a connector axis of the connector are substantially aligned when the spout and connector are assembled together.

16. The assembly of claim 1, wherein the internal thread further comprises a tab restraining portion.

17. The assembly of claim 1, wherein the spout and connector are coupled together with a torque of less than about 10 lbf-in.

18. The assembly of claim 17, wherein the torque is less than about 7 lbf-in.

19. A self-locking fluid flow connector assembly comprising:
   a) a tabbed body having a surface, an axis, and at least one flexible tab protruding away from said surface in a direction perpendicular to said axis; and
   b) a threaded body having an opening adapted to receive said tabbed body, and a thread threadably engaged with the at least one flexible tab, wherein during assembly of the tabbed body and the threaded
      body, the at least one flexible tab deforms and biases the tabbed and threaded bodies toward alignment with each other and
      wherein the at least one flexible tab is deformed such that a torque to the connector is less than about 10 lbf-in.

20. The assembly of claim 19, wherein the thread has an abrupt end, and the at least one flexible tab and the abrupt end provide a positive indication that the tabbed and threaded bodies are fully coupled.

21. The assembly of claim 19, wherein the thread has a tapered thread portion, and the at least one flexible tab and the tapered thread portion provide a positive indication that the tabbed and threaded bodies are fully coupled.

22. The assembly of claim 19, wherein the thread has a detent, the at least one flexible tab and the detent provide a positive indication that the tabbed and threaded bodies are fully coupled.

23. The assembly of any of claims 19, 20, 21, or 22, further comprising a spring assembly that provides an axial force that opposes threading of the tabbed and threaded bodies.

24. The assembly of claim 19, wherein the at least one flexible tab and the thread are so configured and arranged that the tabbed and threaded bodies are fully coupled together with no more than about three-quarters of a turn.

* * * * *